US 11,573,396 B2

(12) United States Patent
Smith (10) Patent No.: US 11,573,396 B2
(45) Date of Patent: Feb. 7, 2023

(54) MULTI-AXIS GIMBAL EXTENDED PIXEL RESOLUTION ACTUATOR

(71) Applicant: Texas Instruments Incorporated, Dallas, TX (US)

(72) Inventor: Steven Edward Smith, Allen, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 76 days.

(21) Appl. No.: 16/198,973

(22) Filed: Nov. 23, 2018

(65) Prior Publication Data

US 2019/0227261 A1 Jul. 25, 2019

Related U.S. Application Data

(60) Provisional application No. 62/620,802, filed on Jan. 23, 2018.

(51) Int. Cl.
*G02B 7/182* (2021.01)
*G02B 26/08* (2006.01)
*G03B 21/00* (2006.01)
*H04N 5/349* (2011.01)

(52) U.S. Cl.
CPC ....... *G02B 7/1821* (2013.01); *G02B 26/0841* (2013.01); *G03B 21/008* (2013.01); *H04N 5/349* (2013.01)

(58) Field of Classification Search
CPC .... G02B 7/1821; G02B 26/0841; G02B 7/00; G02B 26/0816; G02B 26/0833; G02B 26/085; G02B 26/0858; G02B 26/0866; G02B 26/0875; G02B 26/101; H04N 5/349; H04N 9/3141; G03B 21/008; G03B 21/142

See application file for complete search history.

(56) References Cited

U.S. PATENT DOCUMENTS

| | | | |
|---|---|---|---|
| 5,637,861 A * | 6/1997 | Okada | H04N 3/1587 250/208.1 |
| 7,009,752 B1 * | 3/2006 | Lorell | G02B 7/1821 359/198.1 |
| 9,860,495 B2 | 1/2018 | Smith | |
| 2002/0054423 A1 | 5/2002 | Kurematsu | |
| 2004/0114110 A1 | 6/2004 | Shin | |
| 2005/0179951 A1 | 8/2005 | Urakawa | |

(Continued)

FOREIGN PATENT DOCUMENTS

| CN | 203151654 U | 8/2013 |
|---|---|---|
| CN | 107430268 A | 12/2017 |

(Continued)

OTHER PUBLICATIONS

"4K UHD explained", White Paper, Barco nv, Belgium, pp. 1-4.

(Continued)

*Primary Examiner* — Kimberly N. Kakalec
(74) *Attorney, Agent, or Firm* — Michelle F. Murray; Frank D. Cimino (57) ABSTRACT

A multi-axis gimbal actuator includes a first tilt frame tiltably coupled to a second tilt frame. The second frame is tiltably coupled to a reference frame. The first tilt frame is offset from the second tilt frame and approximately parallel to the second tilt frame while in a neutral position. An optical element is mounted on the first tilt frame.

23 Claims, 9 Drawing Sheets

(56) References Cited

U.S. PATENT DOCUMENTS

| | | | |
|---|---|---|---|
| 2008/0080037 A1* | 4/2008 | Oh ..................... | G02B 26/085 |
| | | | 359/225.1 |
| 2009/0002798 A1* | 1/2009 | Ohmori ................ | H02N 1/002 |
| | | | 438/694 |
| 2012/0257117 A1* | 10/2012 | Freundlich ......... | H04N 21/2381 |
| | | | 348/723 |
| 2016/0037147 A1* | 2/2016 | Kempf ................ | H04N 9/3188 |
| | | | 348/744 |
| 2016/0205361 A1 | 7/2016 | Smith | |
| 2017/0003579 A1 | 1/2017 | Abe et al. | |
| 2018/0011285 A1 | 1/2018 | Aschwanden et al. | |
| 2018/0011391 A1 | 1/2018 | Homma et al. | |
| 2019/0278102 A1* | 9/2019 | Suter ................... | G02B 27/646 |

FOREIGN PATENT DOCUMENTS

| | | | | |
|---|---|---|---|---|
| RU | 2011113526 A | 10/2012 | | |
| WO | WO-2016015903 A1 * | 2/2016 | ........... | B81B 3/0062 |
| WO | WO-2016124253 A1 * | 8/2016 | ........... | H04N 9/3188 |

OTHER PUBLICATIONS

"TI DLP 4K Ultra High Definition (UHD) Display Chest", SSNB002,Texas Instruments, Inc., 2017, pp. 1-3.
"Extended Pixel Resolution Actuator XPR-25", Optotune, 2016, available at https://www.optotune.com/products/beam-shifting on Jun. 29, 2018. pp. 1-2.
International Search Report for PCT/US2019/014533 dated May 16, 2019.
First Chinese Office Action dated Jan. 5, 2022, Chinese Application No. 201910056448.8, 30 pages.
Second Chinese Office Action dated Aug. 23, 2022, Chinese Application No. 2019100564488, 28 pages.

* cited by examiner

MULTI-AXIS GIMBAL EXTENDED PIXEL RESOLUTION ACTUATOR

CROSS-REFERENCE TO RELATED APPLICATION

This application claims priority to U.S. Provisional Application No. 62/620,802, filed Jan. 23, 2018 entitled "Monolithic 2-Axis Gimbal XPR Actuator Design," which is incorporated by reference herein.

TECHNICAL FIELD

This relates to a multi-axis gimbal extended pixel resolution actuator that may be used in digital projectors.

BACKGROUND

Digital light processing (DLP) technology is a light manipulation technology that is used in a variety of projection systems. A DLP projection system is an image projection system that includes a light source focused on a controllable multiple mirror element, with a lens assembly that focuses the light reflected by the multiple mirror element and projects the reflected light onto an image screen.

A pico projector is a small hardware device designed to project content from a smartphone, camera, tablet, notebook or memory device onto a wall or other flat surface. Pico projectors are also known as pocket, handheld or mobile projectors and they take several image formats that work in various ways.

Many movie theaters now use digital technology to distribute or project motion pictures as opposed to the historical use of reels of motion picture film, such as 35 mm film. A digital movie can be distributed to cinemas in several ways: over the Internet or dedicated satellite links, or by sending hard drives or optical discs such as Blu-ray discs. Digital movies are projected using a digital video projector instead of a film projector. In digital cinema, resolutions are represented by the horizontal pixel count, such as 2K (2048×1080 or 2.2 megapixels) or 4K (4096×2160 or 8.8 megapixels).

Digital projectors are also used for high-definition televisions, meeting and conference image and video presentations, etc. The various digital projector applications may use traditional television or other traditional high-definition video standards, various aspect ratios, various frame rates, etc.

DLP technology made possible by the advent of digital micromirror device (DMD) chips has led to the emergence of significant new projection display technology. In addition to commercial success in high definition television, theater projection systems, business and personal projection systems, DLP technology is being applied in the areas of adaptive lighting, medical imaging, photo-finishing, biotechnology applications, lithography, spectroscopy, scientific instrumentation, and other applications

SUMMARY

In described examples, a multi-axis gimbal actuator includes a first tilt frame tiltably coupled to a second tilt frame. The second tilt frame is tiltably coupled to a reference frame. The first tilt frame is offset from the second tilt frame and approximately parallel to the second tilt frame while in a neutral position. An optical element is mounted within the first tilt frame. Each tilt axis is positioned on a different plane with hinges for each of the two axes placed behind each tilt plane to reduce the overall size of the actuator.

DETAILED DESCRIPTION

In the drawings, like elements are denoted by like reference numerals for consistency.

A DLP projection system is an image projection system that includes a light source focused on a controllable multiple mirror element, with a lens assembly that focuses the light reflected by the multiple mirror element and projects the reflected light onto an image screen. Each mirror corresponds to an image pixel, and the mirrors are controlled digitally to turn each image pixel on or off. The multiple mirror element may be referred to as a "digital micromirror device" (DMD). A DMD is a semiconductor-based "light switch" array that includes a large number (thousands or millions) of individually addressable, tiltable, mirrors. Each mirror of the DMD is attached to one or more hinges on which the mirror can tilt. Addressing circuitry associated with each mirror generates electrostatic forces that can selectively tilt the mirror. The DMD is a spatial light modulator and provides many advantages to light-steering applications.

For display applications, the DMD is controlled with image data. Responsive to the image data, light is selectively reflected from each mirror for projection. When individual mirrors direct light through an imaging lens, an imaging surface, such as a screen, is selectively illuminated. When the mirror reflects light away from the imaging lens, the reflected light is collected in a discard area. Modulation techniques are used to provide grayscale images. A quick succession of frames is perceived by the viewer as a full motion display.

There are a variety of techniques for generating color displays using a DMD. One approach is to generate multiple images with multiple spatial light modulators (SLMs). For example, one SLM may be used for each of red, green and blue. Each image has a desired intensity and the images are combined to result in a correctly colored display. A second approach is to use a single SLM and generate images for each color (red, green, and blue) sequentially. A white light source may be filtered through a revolving color wheel to form multiple primary colors. Alternatively, different color sources, such as light emitting diodes (LED), lasers, etc. may be used to produce multiple primary colors. Each color may then be sequentially reflected by the SLM to produce a desired color in the projected image. The differently colored images are generated so quickly that the eye of the view integrates the images into a correctly colored frame.

DMD spatial light modulators provide several advantages over competing image generation technologies. DMD based projection devices may be smaller and less costly than projection systems based on other technologies. However, DMD-based projection systems are not without limitations. In some applications, the pixel resolution of a projection system may be limited by the number of mirrors provided by the DMD. To provide pixel resolution that exceeds the number of mirrors on the DMD, some projection systems provide an actuator in the projection path that displaces an image generated by the DMD. For example, two successive images generated by the DMD may offset from one another and interlaced to generate a higher resolution image.

An extended pixel resolution (XPR) two-axis actuator described in more detail hereinbelow contains an optical element (window) in the projection path that displaces the image a half pixel in a vertical direction and a half pixel in a horizontal direction thereby generating four on-screen pixels with each DMD mirror. The actuator is placed in front of a projection lens. The window is tilted up and down and back and forth with a square or sinusoidal waveform to refract, or displace, the pixel. Each tilt axis is positioned on a different plane with hinges for each of the two axes offset behind each tilt plane to reduce the overall size of the XPR actuator.

FIGS. 1A-1D illustrate operation of an example extended pixel resolution (XPR) actuator. In this example, optical element 100 is a flat piece of material that is optically transparent. In this example, optical element 100 is clear plastic. In other examples, it may be glass or another optically transparent material. Optical element 100 may be tilted on a first axis as indicated at 103 and on a second axis that is orthogonal to the first axis as indicated at 104.

A ray of light 101 representative of one pixel of an image that is reflected from a DMD (not shown) towards optical element 100 is illustrated. It is to be understood that multiple rays of light for a large number of image pixels may be passed through optical element 100 in the same way. When optical element 100 is perpendicular to ray 101, then ray 101 traverses optical element 100 following path 105. However, when the optical element 101 is tilted by angle 106 (Θ) then ray 101 is refracted at the first surface of optical element 100 as it enters and again at the second surface as it leaves to follow path 107. In this manner, the path of ray 101 is diffracted by an amount (Δy) indicated by expression (1).

$$\Delta y = t\ \sin\theta \left(1 - \sqrt{\frac{1 - \sin^2\theta}{n^2 - \sin^2\theta}}\right) \quad (1)$$

The thickness (t) of the optical element, index of refraction (n) of the optical element, and angle 106 (Θ), are selected so that Δy is equal to approximately one fourth of the pixel size. In this manner, optical element 100 can be tilted down and to the left to form pixel 111, up and left to form pixel 112, up and right to form pixel 113, and down and right to form pixel 114. In this example, this sequence is repeated at a rate of approximately 60 Hz which is not perceptible to the typical human eye. In this manner, one mirror of the DMD (not shown) can form four different pixels, thereby increasing the resolution of a resulting image by 4×.

Figure 1A:
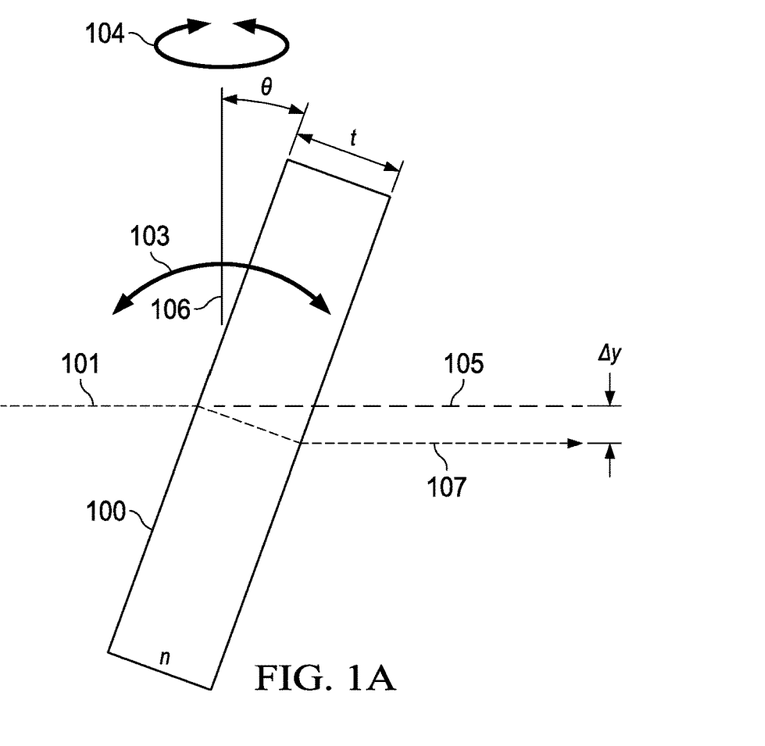
FIGS. 1A, 1B, 1C, 1D illustrate operation of an extended pixel resolution (XPR) actuator.
Figure 1B:
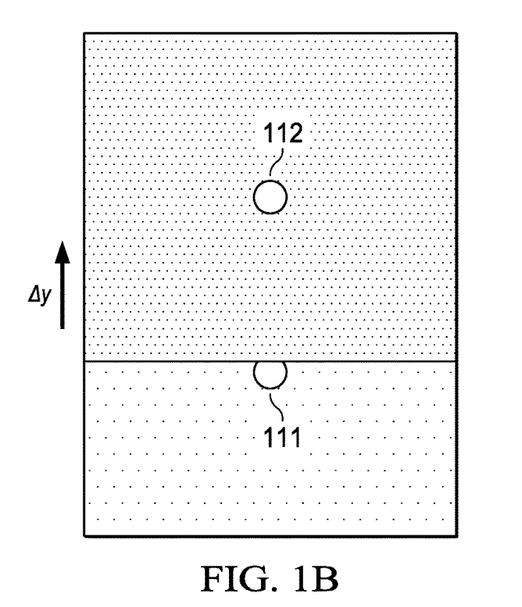
Figure 1C:
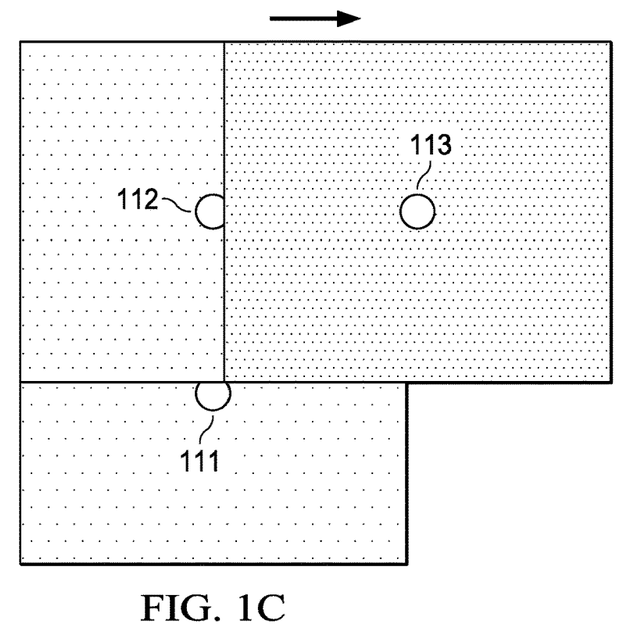
Figure 1D:
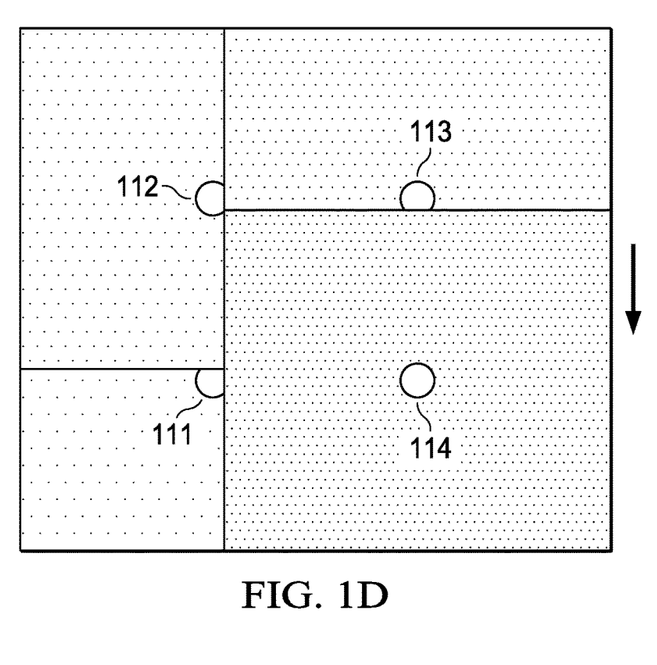
Figure 2:
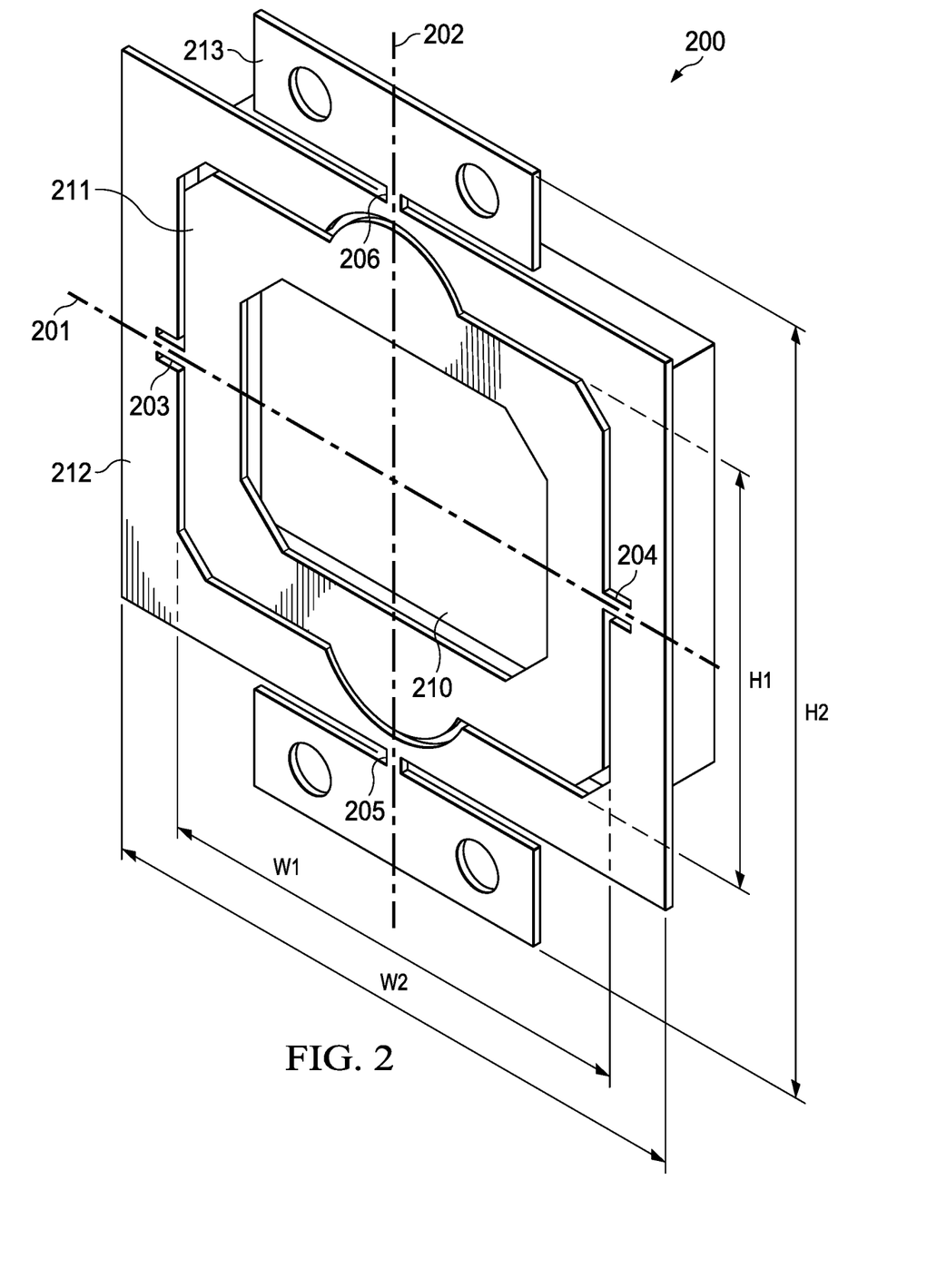
FIG. 2 is an isometric projection of an XPR actuator with coplanar hinges.

FIG. 2 is an isometric projection of an XPR actuator 200 with coplanar hinges. In this example, there are two axes of motion: horizontal axis 201 and vertical axis 202, which are both located on a same plane. A frame 211 holds an optical element 210 such as optical element 100 (FIG. 1A). Hinges 203, 204 allow movement frame 211 and optical element 210 on horizontal axis 201. Hinges 205, 206 allow movement of frame 212 and thereby frame 211 and optical element 210 relevant to frame 213 on vertical axis 202. In this manner, pixel resolution may be increased, as described with reference to FIGS. 1A-1D.

In this example, hinges 203-206 are all coplanar with frames 211-213. Therefore, the height H2 of XPR actuator 200 is significantly larger than the height H1 of frame 211. Similarly, width W2 is significantly larger than the width W1 of frame 211.

Figure 3:
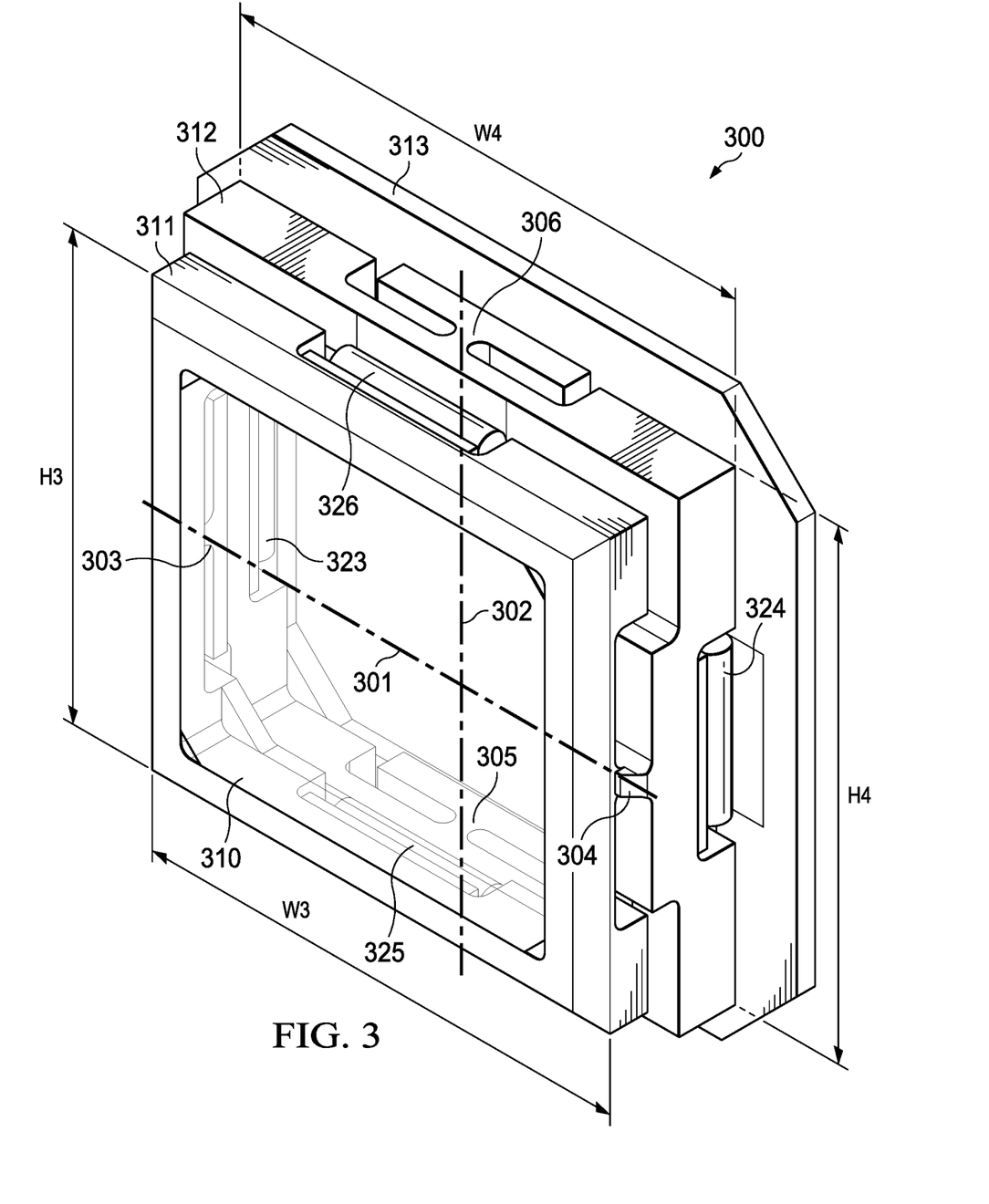
FIG. 3 is an isometric projection of an example XPR actuator with two offset tilt planes with offset hinges mounted behind the tilt planes.

FIG. 3 is an isometric projection of an example XPR actuator 300 with two offset tilt planes with offset hinges mounted behind the tilt planes. In this example, there are two axes of motion: horizontal axis 301 and vertical axis 302, which are located different planes. Tilt frame 311 is mounted in front of tilt frame 312. In this example, "in front of" refers to away from the projection lens, see lens 608 in FIG. 6. Tilt frame 311 holds an optical element 310 like optical element 100 (FIG. 1A). In this example, optical element 310 is a pane of transparent material fitted within an opening in the tilt frame 311. Tilt frame 312 and reference frame 313 include an opening approximately equal in size to the opening in tilt frame 311. In at least some example embodiments, the term "approximately equal in size" means exactly or within 5% of exactly equal in size.

Hinges 303, 304 provide a pivot point and allow movement tilt frame 311 and optical element 310 on horizontal axis 301. Hinges 305, 306 provide a pivot point and allow movement of tilt frame 312 and thereby frame 311 and optical element 310 relevant to reference frame 313 on vertical axis 302. In this manner, pixel resolution may be increased, as described with reference to FIGS. 1A-1D.

In this example, hinges 303, 304 are offset from axis 301 such that tilt frame 311 is offset from and positioned in front of and approximately parallel to tilt frame 312 while in a neutral position. Hinges 303, 304 are positioned within a perimeter of tilt frame 311 defined by width W2 and height 31. Similarly, hinges 305, 306 are offset from axis 302 such that tilt frame 312 is positioned in front of and approximately parallel to reference frame 313 while in a neutral position. Hinges 305, 306 are positioned within a perimeter of tilt frame 312 defined by width W4 and height H4. In this manner, height H4 of frame 312 can be maintained the same or only slightly larger than height H3 of frame 311. Similarly, width W4 of frame 312 can be maintained the same or only slightly larger than width W3 of frame 311. In at least some example embodiments, the term "approximately parallel" means exactly or within 5% of exactly. For example, in at least some example embodiments, the term "approximately parallel" means exactly parallel or within 4.5 degrees of exactly parallel.

In this manner, the overall height and width of XPR actuator 300 is made significantly smaller that the overall height and width of XPR actuator 200 (FIG. 2) while optic element 310 is approximately a same size as optic element 210 (FIG. 2).

In this example, motion of tilt frame 312 relative to reference frame 313 is controlled by voice coil motors 325, 326. Similarly, motion of tilt frame 311 relative to tilt frame 312 is controlled by voice coil motors 323, 324. Each voice coil motor 323-326 includes a permanent magnet cylinder and a coil that when energized causes a magnetic attraction to the nearby permanent magnet. Thus, by controlled excitation of the coils, tilt frame 311 and tilt frame 312 are moved to reposition pixels to increase image resolution, as described hereinabove.

Each hinge 303-306 is made from a flexible material and acts as a spring to maintain each frame in a neutral position until deflected by voice coil motors, as described hereinabove.

Figure 4A:
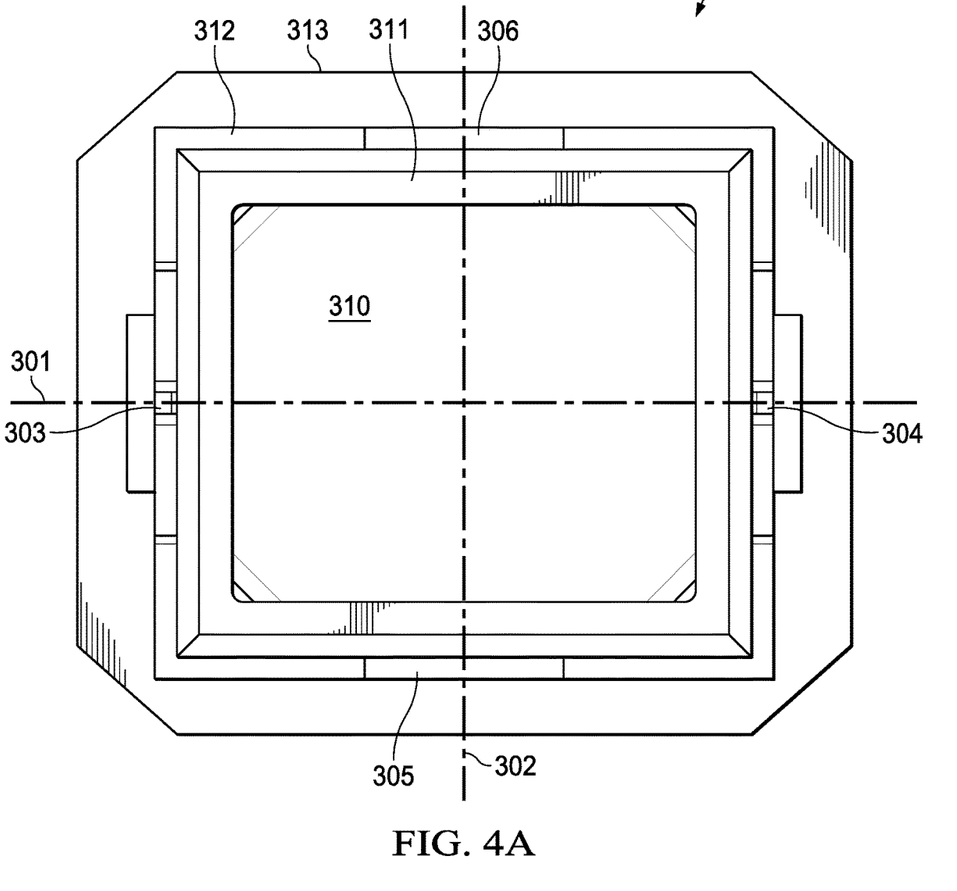
FIGS. 4A, 4B, 4C are front, side and bottom views of the example XPR actuator of FIG. 3.
Figure 4B:
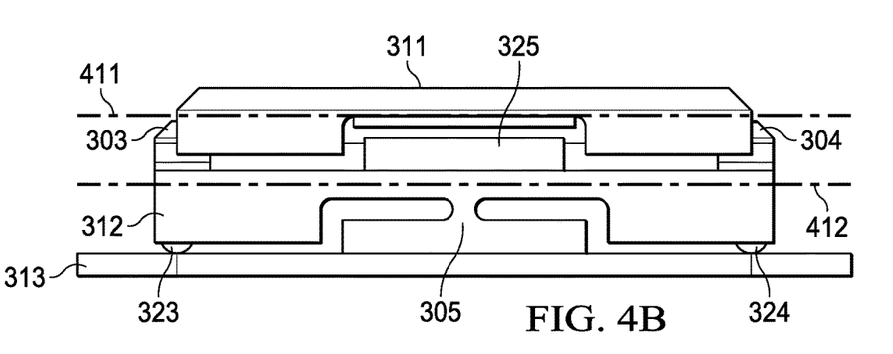
Figure 4C:
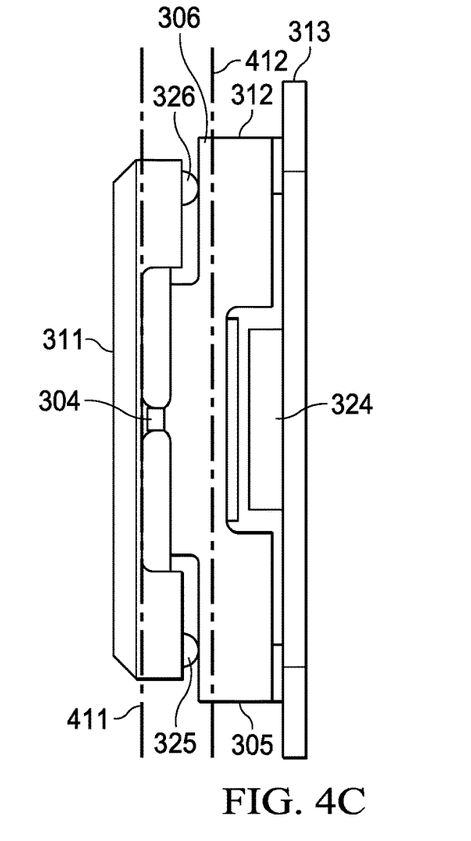

FIGS. 4A-4C are front, side and bottom views of the example XPR actuator 300 of FIG. 3. FIG. 4B shows in more detail how hinge 305, and similarly hinge 306, are offset from tilt plane 412. Tilt plane 412 represents the plane on which tilt frame 312 tilts around tilt axis 302.

Similarly, FIG. 4C shows in more detail how hinge 304, and similarly hinge 303, are offset from tilt plane 411. Tilt plane 411 represents the plane on which tilt frame 311 tilts around axis 301.

In this manner, hinges 303, 304 are offset and positioned between tilt plane 411 and tilt plane 412. Similarly, hinges 305, 306 are offset and positioned between tilt plane 412 and reference frame 313. This allows the overall height and width of XPR actuator 300 to be limited to approximately the same size as frame 311 which holds optic element 310.

Figure 5A:
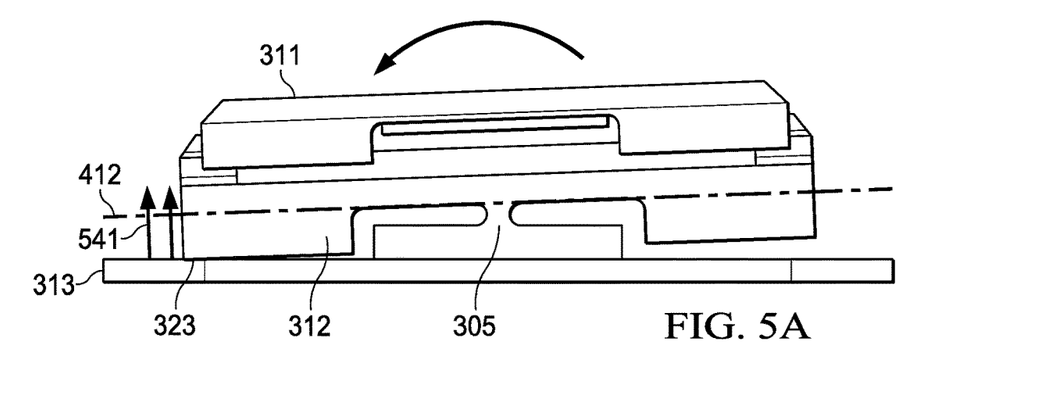
FIGS. 5A, 5B illustrate tilt motion in two axes.
Figure 5B:
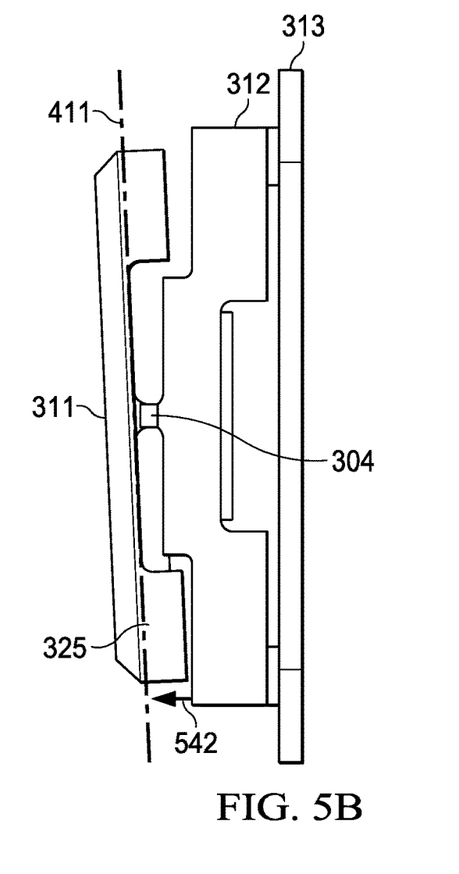

FIGS. 5A-5B illustrate tilt motion of XPR actuator 300 in two axes. FIG. 5A illustrates tilting around vertical axis 302 (FIG. 3). In this example, a magnetic force indicated at 541 produced by exciting a coil located adjacent permanent magnet 323 attracts permanent magnet 323 and causes frame 312 to tilt around hinges 305, 306 (FIG. 3). An opposite tilt is also produced by exciting a coil adjacent permanent magnet 324 (FIG. 3).

FIG. 5B illustrates tilting around horizontal axis 301 (FIG. 3). In this example, a magnetic force indicated at 542 produced by exciting a coil located adjacent permanent magnet 325 attracts permanent magnet 325 and causes frame 311 to tilt around hinges 304, 303 (FIG. 3). An opposite tilt is also produced by exciting a coil adjacent permanent magnet 326 (FIG. 3).

In this example, frames 311, 312 are designed to "hover" at a tilt location rather than making physical contact with an adjacent frame so that audio noise is not produced by the tilting operation.

Figure 6:
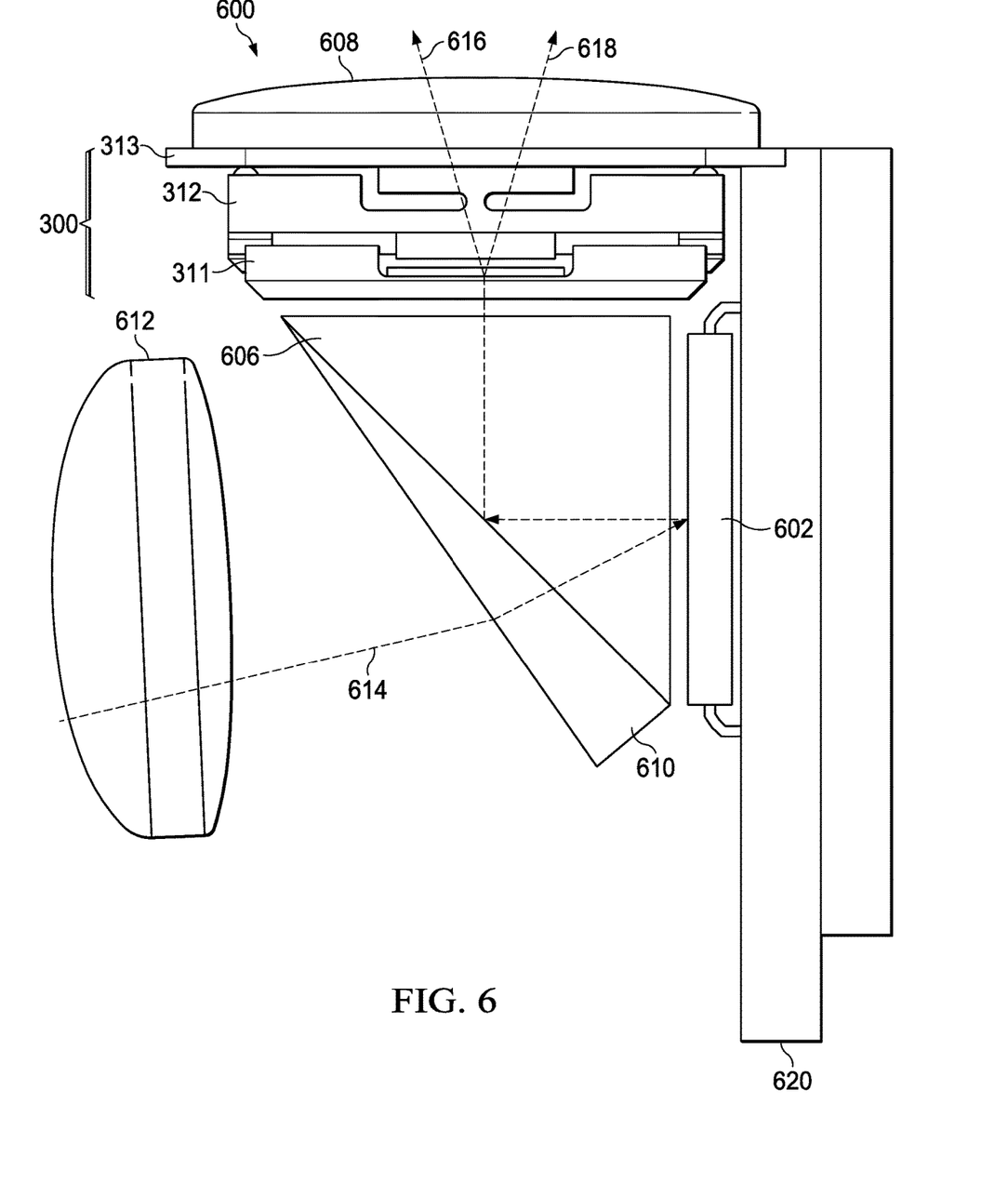
FIG. 6 is a top view of an example projector that includes the example XPR actuator of FIG. 3.

FIG. 6 is a top view of an example projector 600 that includes the example XPR actuator 300 of FIG. 3. The image projection system 600 includes a DMD 602, a two axis tiltable actuator 300, a reverse total internal reflection (RTIR) prism 606, a projection lens 608, a wedge prism 610, and a lens 612. The DMD 602 may be mounted on a substrate such as a printed circuit board 620. Various components of the projection system 600 have been omitted in the interest of clarity. For example, the projection system 600 may also include a light source that generates the light 614 reflected by the DMD 602, control systems that transfer image data to the DMD 602 and synchronize tilt operation of the XPR actuator 300 with image generation in the DMD 602, power supplies, cooling systems, audio systems, additional optical elements, enclosures, and other components.

In the projection system 600, the lens 612 directs the light beam 614 into the wedge prism 610. Light beam 614 represents a portion of the total light beam that fall on one mirror of DMD 602 and thereby forms one pixel of a total image. Light beams for all the pixels of an image follow a similar path. The geometry of the wedge prism 610 allows the light beam 614 to pass along a substantially straight line through the wedge prism 610 and the RTIR prism 606. The mirrors of the DMD 602 are set to reflect the light beam 614 towards or away from the projection lens 608. Light to be projected, via the projection lens 608, is reflected into the RTIR prism 606, and reflected in the RTIR prism 606 through the XPR actuator 300 to the projection lens 608.

As described hereinabove in more detail, by successively setting the DMD mirror as each light beam from a given DMD mirror passes through XPR actuator 300, the XPR actuator is tilted either left, right, up, or down and to sequentially create four image pixels. For example, the path of the light beam 614 may be tilted to the left and up or down to follow path 616 or tilted to the right and up or down to follow path 618.

In the projection system 600, color images may be formed by successively directing light beams of different colors to the DMD 602 and successively setting the mirrors of the DMD 602 for each color. For example, if red, green, and blue colors are used to produce a color image, then for each image frame, the red light may be directed to the DMD 602 for a first interval, green light may be directed to the DMD 602 for a second interval, and blue light may be directed to the DMD 602 for a third interval. The mirror pattern of the DMD 602, and the duration for which each mirror reflects light to the projection lens 608 may change for each light color. Ultimately, the viewer's visual system mixes the projected colors to produce the final image colors. The different light beam colors directed to the DMD 602 may be generated by passing a white light beam through the filters of a rotating color wheel, by activation of colored light sources, or by other known or later developed techniques of colored light generation.

Projector 600 may be included within a mobile "smart" phone and used to project images onto a viewing surface to provide a larger image than can be provided on a viewing screen of the smart phone. In another example, a projector based on the principles described herein may be scaled up to a larger size using larger lenses and brighter light to form a portable projector for use in business meetings, for example. In anther example, a projector based on the principles described herein may be scaled up to a larger size using larger lenses and brighter light to form a fixed projector for use in cinema theater for projection onto a theater size screen.

Tilt frames 311, 312 and reference plane 313 of actuator 300 may be fabricated using known or later developed plastic or metal molding processes, depending on the thermal requirements of the final product. In some example, tilt frames 311, 312 and reference frame 313 may be molded as a single monolithic part with spring hinges. In another example, each frame may be a separate part and the frames may be tiltably joined with various types of hinge structures. For example, large cinema projectors that use high power light sources may be made from metal, while a small projector for use within a cell phone may be made from plastic.

Figure 7:
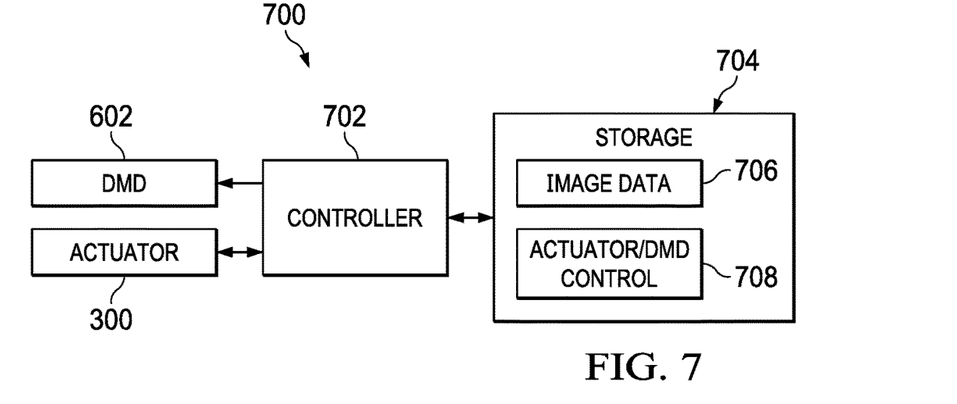
FIG. 7 is a block diagram of an example control system for the projector of FIG. 6.

FIG. 7 shows a block diagram for a control system 700 of the image projector 600 (FIG. 6) in accordance with principles disclosed herein. The control system 700 includes a controller 702 and storage 704. The controller 702 is coupled to the DMD 602 and the CPR actuator 300. Various components of the control system 700 have been omitted in the interest of clarity. For example, the control system 700 may include input/output interfaces that facilitate the transfer of image data to the control system 700 from a source coupled to the projection system 600, network adapters, etc.

The controller 702 may include a general-purpose microprocessor, digital signal processor, microcontroller, or other device capable of executing instructions retrieved from a computer-readable storage medium. Processor architectures generally include execution units (such as: fixed point, floating point, integer, or other execution units), storage (such as registers or memory), instruction decoding, peripherals (such as interrupt controllers, timers, and/or direct memory access controllers), input/output systems (such as serial ports, parallel ports, etc.) and various other components and sub-systems. The controller 702 may also include voice motor control and drive circuitry for XPR actuator 300, specialized video/graphics processing systems, etc.

The storage 704 is a non-transitory computer-readable storage medium suitable for storing instructions executable by the controller 702, and for storing image data 706 that defines the images to be displayed by the projection system 600. The storage 704 may include volatile storage such as random-access memory, non-volatile storage (such as a hard drive, an optical storage device (for example a CD or DVD drive), FLASH storage, read-only-memory), or combinations thereof.

The storage 704 includes an actuator/DMD control module 708 that includes instructions for controlling the operation of the DMD 602 and the XPR actuator 300. For example, the controller 702 may execute instructions of the actuator/DMD control module 708 to derive mirror patterns from the image data 606, to transfer mirror pattern data to the DMD 602, to synchronize tilting of the actuator 300 with the images to be interlaced as generated by the DMD 602, to synchronize the generation of colored light beams directed to the DMD 602 with transfer of mirror pattern data to the DMD 602, and/or to synchronize tilting of the actuator 300 with the generation of the colored light beams.

Some examples of the control system 700 include dedicated control circuitry that performs at least some of the functions described above. Some examples may control the tilting actuator 300, the DMD 602, and other components of the projection system 600 via a combination of dedicated control circuitry and execution of instructions provided in the storage 704.

Figure 8:
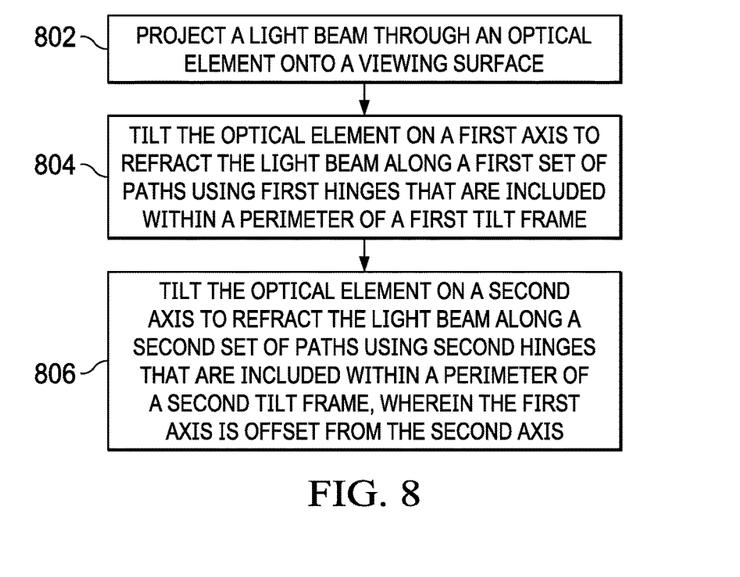
FIG. 8 is a flow diagram illustrating operation of an example XPR actuator.

FIG. 8 is a flow diagram illustrating operation of an example XPR actuator, such as XPR actuator 300 (FIG. 3). At 802, a light beam is projected through an optical element onto a viewing surface. As described hereinabove in more detail, a DMD spatial light modulator may be used to reflect beams of light from each mirror element that represent pixels of an image that is displayed on the viewing surface. A light source, such as a lamp, a light emitting diode, a laser, etc. may be used to illuminate the DMD spatial light modulator. The viewing surface may be a wall, a reflective screen, a desk or counter top, etc.

At 804, the optical element is tilted on a first axis to refract the light beam along a first set of paths using first hinges that are included within a perimeter of a first tilt frame. As described hereinabove in more detail, various techniques may be used to tilt the optical element, such as voice coil motors, solenoids or other types of linear actuators, motor driven eccentric mechanisms, etc.

At 806, the optical element is tilted on a second axis to refract the light beam along a second set of paths using second hinges that are included within a perimeter of a second tilt frame, wherein the first axis is offset from the second axis. Each tilt axis is positioned on a different plane with hinges for each of the two axes placed behind each tilt plane to reduce the overall size of the XPR actuator.

In this manner, the optical element is tilted down and to the left to form a first pixel, up and left to form a second pixel, up and right to form a third pixel, and down and right to form a fourth pixel. In this example, this sequence is repeated at a rate of approximately 60 Hz which is not perceptible to the typical human eye. In this manner, one mirror of the DMD can be successively set to form four different pixels, thereby increasing the resolution of a resulting image by 4×.

Figure 9:
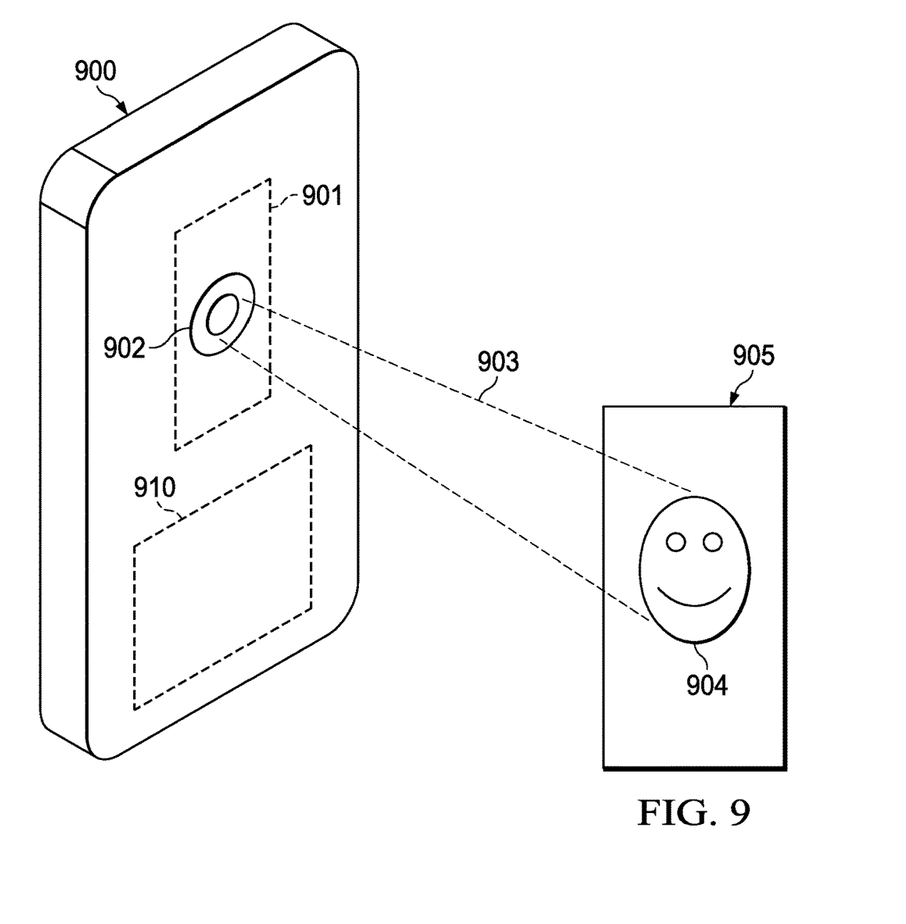
FIG. 9 is an example mobile phone that includes a pico projector.

FIG. 9 is an example mobile phone 900 that includes a pico projector 901. Mobile phones are becoming ubiquitous and may be configured with various applications to provide a wide array of services to a user. A small projector 901, which may be referred to as a pico projector, that includes an example XPR actuator 300 (FIG. 3) as described hereinabove in more detail may be miniaturized to allow it to be included within mobile phone 900. A projection lens 902 projects an image 904 onto a surface 905. Transceiver circuitry within the mobile phone's circuitry 910 can communicate with a cellular network to download picture and video data that is provided to projector 901 and thereby projected onto surface 905. Similarly, image or video taken by an onboard camera (not shown) and stored in circuitry 910 may also be provided to projector 901 and thereby projected onto surface 905.

A light source, such as a light emitting diode, a laser, etc. may be used to illuminate a DMD spatial light modulator that is included within projector 901. The viewing surface 905 may be a wall, a reflective screen, a desk or counter top, etc.

Other Embodiments

In described examples, an XPR actuator may be included within in a projector for a smart phone. Other examples may be included in business projectors, cinema projectors, industrial control systems, virtual reality systems, adaptive lighting, medical imaging, photo-finishing, biotechnology applications, lithography, spectroscopy, scientific instrumentation, and other applications.

While a two-axis actuator is described hereinabove, in another example a one axis actuator may be designed in which a pixel pattern is shifted diagonally to increase resolution.

In another example, three or more axes may be used to provide additional extended pixel resolution.

In another example, an additional tilt location may be implemented, such as left-center-right, and up-center-down to create a 3×3 expanded pixel resolution.

In described examples, a flexible spring such as springs 303-306 is illustrated. In another example, a different known or later developed tilting mechanisms may be used. For example, a bearing that rotates on a shaft may be used, especially for larger examples.

In described examples, voice coil motors are used to cause each tilt frame to move. In other examples, another type of known or later developed technique may be used to cause each tilt frame to move. For example, solenoids or other types of linear actuators may be used. In another example, a motor driven eccentric mechanism may be used.

In described examples, an optical element with a rectangular outline is illustrated. In other examples, the optical element may have a different shape, such as square, or even round.

In described examples, a side illuminated projection system configuration is illustrated. In other examples, different configurations may be used, such as top or bottom illuminated configuration.

In described examples, the XPR actuator is placed between the prism and the projection lens. In other examples, different configurations may be used. For example, the XPR actuator may be placed between the DMD and the prism.

In this description, the term "couple" and derivatives thereof mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection.

Modifications are possible in the described embodiments, and other embodiments are possible, within the scope of the claims.

What is claimed is:

1. A device comprising:
    an actuator comprising:
        a first tilt frame;
        a second tilt frame;
        a reference frame;
        first hinges between the first tilt frame and the second tilt frame, the first hinges behind the first tilt frame;
        second hinges between the second tilt frame and the reference frame, the second hinges behind the second tilt frame;
        first motors between the first tilt frame and the second tilt frame, the first motors between the second hinges and the first tilt frame, the first motors behind the first tilt frame, and the second hinges behind the first motors;
        second motors between the second tilt frame and the reference frame, the second motors behind the second tilt frame, the first hinges between the second motors and the first tilt frame, and the second motors behind the first hinges; and
    an optical element mounted in the first tilt frame.

2. The device of claim 1, wherein the first tilt frame is tiltably coupled to the second tilt frame with a pivot point positioned between a first tilt plane of the first tilt frame and a second tilt plane of the second tilt frame.

3. The device of claim 2, wherein the first tilt frame is tiltably coupled to the second tilt frame with the first hinges located on opposite sides of the first tilt frame, wherein the first hinges are perpendicular to the first tilt plane.

4. The device of claim 3, wherein the first tilt frame has a perimeter, and wherein the first hinges are positioned within the perimeter of the first tilt frame.

5. The device of claim 3, wherein the first hinges are spring hinges.

6. The device of claim 2, wherein the pivot point is a first pivot point, wherein the second tilt frame is offset from the reference frame and within 4.5 degrees of parallel to the reference frame while in a neutral position; and
    wherein the second tilt frame is tiltably coupled to the reference frame by a second pivot point positioned between the second tilt plane and the reference frame.

7. The device of claim 6, wherein the second tilt frame is tiltably coupled to the reference frame with the second hinges located on opposite sides of the second tilt frame, wherein the second hinges are perpendicular to the second tilt plane.

8. The device of claim 7, wherein the second tilt frame has a perimeter, and wherein the second hinges are positioned within the perimeter of the second tilt frame.

9. The device of claim 1, wherein the optical element is a pane of transparent material within an opening in the first tilt frame, and wherein the second tilt frame and the reference frame include an opening having a size within 5% of the size of the opening in the first tilt frame.

10. The device of claim 1, wherein the device is a projector, the device further including:
    a digital mirror device (DMD); and
    a reverse total internal reflection (RTIR) prism configured to receive light reflected by DMD and direct the light through the optical element.

11. The device of claim 10, wherein the device is a mobile phone, the mobile phone further including:
    circuitry configured to receive video data from a cellular network, the circuitry configured to provide the video data to the DMD.

12. The device of claim 1, wherein the first tilt frame is offset from the second tilt frame and within 4.5 degrees of parallel to the second tilt frame while in a neutral position.

13. The device of claim 1, wherein the first motors are within a perimeter of the first tilt frame.

14. The device of claim 1, wherein the first motors are configured to tilt the first tilt frame and the second motors are configured to tilt the second tilt frame.

15. A projector comprising:
    an actuator comprising:
        a first tilt frame;
        a second tilt frame;
        a reference frame;
        an optical element in the first tilt frame;
        first hinges between the first tilt frame and the second tilt frame, the first hinges behind the first tilt frame;
        second hinges between the second tilt frame and the reference frame, the second hinges behind the second tilt frame;
        first motors between the first tilt frame and the second tilt frame, the first motors between the second hinges and the first tilt frame, the first motors behind the first tilt frame, and the second hinges behind the first motors; and
        second motors between the second tilt frame and the reference frame, the first hinges between the second motors and the first tilt frame, the second motors behind the second tilt frame, and the second motors behind the first hinges;
    a spatial light modulator; and
    a reverse total internal reflection (RTIR) prism optically coupled between the spatial light modulator and the optical element.

16. The projector of claim 15, wherein the first tilt frame is tiltably coupled to the second tilt frame with a pivot point positioned between a first tilt plane of the first tilt frame and a second tilt plane of the second tilt frame.

17. The projector of claim 16, wherein the first tilt frame is tiltably coupled to the second tilt frame with the first hinges located on opposite sides of the first tilt frame, wherein the first hinges are perpendicular to the first tilt plane.

18. The projector of claim 17, wherein the first tilt frame has a perimeter, and wherein the first hinges are positioned within the perimeter of the first tilt frame.

19. The projector of claim 17, wherein the first hinges are spring hinges.

20. The projector of claim 16, wherein the pivot point is a first pivot point, and wherein the second tilt frame is offset from the reference frame and within 4.5 degrees of parallel to the reference frame while in a neutral position; and wherein the second tilt frame is tiltably coupled to the reference frame by a second pivot point positioned between the second tilt plane and the reference frame.

21. The projector of claim 20, wherein the second tilt frame is tiltably coupled to the reference frame with the second hinges located on opposite sides of the second tilt frame, wherein the second hinges are perpendicular to the second tilt plane; and wherein the second tilt frame has a perimeter, and wherein the second hinges are positioned within the perimeter of the second tilt frame.

22. The projector of claim 15, wherein the optical element is a pane of transparent material fitted within an opening in the first tilt frame, and wherein the second tilt frame and the reference frame include an opening having a size within 5% of the size of the opening in the first tilt frame.

23. A method comprising:

projecting a light beam through an optical element;

tilting the optical element on a first axis to refract the light beam along a first set of paths using first hinges between a first tilt frame and a second tilt frame using first motors between the first tilt frame and a second tilt frame, the first hinges behind the first tilt frame and the first motors behind the first tilt frame; and tilting the optical element on a second axis to refract the light beam along a second set of paths using second hinges between the first tilt frame and the second tilt frame using second motors between the second tilt frame and a reference frame, the second hinges behind the second tilt frame, the first motors between the second hinges and the first tilt frame, the first hinges between the second motors and the first tilt frame, the second hinges behind the second tilt frame, the second hinges behind the first hinges, and the second motors behind the first hinges.

* * * * *